Patented Nov. 14, 1922.

1,435,650

UNITED STATES PATENT OFFICE.

WALDEMAR OSCAR MITSCHERLING, OF WILMINGTON, DELAWARE, ASSIGNOR TO ATLAS POWDER COMPANY, OF WILMINGTON, DELAWARE, A CORPORATION OF DELAWARE.

PROCESS FOR THE PREPARATION OF VISCOSE SOLUTIONS OF CELLULOSE FOR THE PRODUCTION OF CELLULOSE FILMS, FILAMENTS, OR THREADS.

No Drawing. Application filed February 9, 1922. Serial No. 535,371.

*To all whom it may concern:*

Be it known that I, WALDEMAR OSCAR MITSCHERLING, citizen of the United States, residing at Wilmington, in the county of New Castle and State of Delaware, have invented certain new and useful Improvements in Processes for the Preparation of Viscose Solutions of Cellulose for the Production of Cellulose Films, Filaments, or Threads, of which the following is a specification.

This invention relates to a process for the preparation of viscose solutions of cellulose for the production of cellulose films, filaments or threads. One of the principal objects of the invention is to produce a solution of the character indicated possessing marked keeping qualities so that the solutions may be used over a long period of time and at the same time will yield products of a high grade.

It has been the practice, heretofore, in the preparation of viscose solutions for the purposes indicated to treat cellulose with a $17\frac{1}{2}\%$ to 20% solution of caustic soda for several hours and then press out the excess of caustic and allow the pressed cake to age for a definite period, usually several days, at a low temperature. The pressed cake is then treated with carbon bisulphide which is 40–60% of the weight of cellulose used. This results in giving a straw-colored viscous mass. Upon dilution with a suitable caustic alkali solution of about 10% alkalinity, a 5–6% (cellulose) spinning solution is made up.

The solutions thus prepared are unstable and gradually decompose so that the mass sets up to a solid jelly in about a week. In consequence the solution must be spun away before setting up takes place, i. e., usually within about four days from the time the carbon bisulphide ($CS_2$) is used.

It is a well-known fact that the threads or films obtained when the solution is fresh are better than when an older solution is used, so that the quality of the product varies continuously, due to the progressive decomposition of the viscose solution. Another disadvantage of the ordinary method is that owing to the excessive amounts of caustic soda and of carbon bisulphide which are used, decomposition products are produced which cause serious corrosion of the apparatus. This has necessitated the substitution of costly alloys or non-metallic materials in place of iron in the apparatus.

I have now found that it is not necessary to age the soda-cellulose in the above manner for so long a time nor that so much caustic soda is required to give a desirable viscose solution. The soda-cellulose, after pressing, can immediately and successfully be treated with carbon bisulphide which permits an amount of carbon bisulphide to be used which is considerably less than indicated above. In addition to the saving of materials, the product resulting is stronger and the luster can be controlled through regulation of the initial ageing. By this means it is also possible to prepare solutions of high viscosity, for the percentage of cellulose contained therein, and they are in consequence very suitable for the production of films.

I have, furthermore, found that a slight excess of caustic soda increases the keeping qualities very materially. For example, a solution containing 5% of cellulose should have 5% caustic in it to give a 1:1 solution. An excess of caustic not exceeding 2%, i. e., making the total caustic 7% instead of 5%, increases the life or keeping qualities of the solution sixty hours or more. I have furthermore found that since in the decomposition of a viscose solution, thiosulphates are formed, the addition of a small percentage of sodium thiosulphate delays the decomposition of the spinning solution materially which makes it possible to get a more uniform product and obviates the necessity of spinning away a solution in four or five days. By using an amount of sodium thiosulphate which was 1% of the cellulose used, the keeping qualities of the viscose solution have been prolonged, at least, to thirty days. The thiosulphate acts moreover as a preservative and prevents or materially retards the decomposition of cellulose into sugars, or as it is sometimes expressed, into alcohols of the multiple type. The thiosulphate does away with or obviates the addition of sugars, glycerin, and other alcohols of the multiple type which have been used hitherto to prevent or retard the decomposition of the cellulose molecule. In mentioning the above amount of thiosulphate to be used, it is not the intention to limit the amount to this particular figure.

An example of the manner of carrying out the process may be given as follows:

Cellulose, usually in the form of air dry, wood pulp containing about 20% of moisture and impurities, is treated with a 20% caustic soda solution. This treatment may be effected by soaking the sheets of wood pulp in the caustic or during shredding of the pulp in a shredding or mixing machine. The treated pulp is then pressed to remove excess of alkali so that the press cake contains one part by weight of caustic soda to each two parts by weight of actual cellulose. The resulting press cake which is quite elastic is then treated with carbon bisulphide giving a fluffy yellowish mass of xanthate. The amount of carbon bisulphide used instead of being 40 to 60% as heretofore, is only 30 to 32% of the actual cellulose in the cake. The xanthate is treated without ageing with a solution of caustic soda to which about one per cent of sodium thiosulphate has been added which amount is based on the actual cellulose present. The total amount of caustic in the final viscose solution is such that not less than the weight of cellulose and not more than 2% more than the total cellulose is present in the solution. It is important to keep the excess of the caustic within this limit as a larger excess is detrimental.

The invention is not restricted to adding the carbon bisulphide immediately to the press cake or soda cellulose. The press cake may be permitted to stand for twenty-four hours before adding the carbon bisulphide but even this represents a marked saving in time over the very considerable time heretofore required for ageing the press cake. Therefore, I do not wish to be limited to adding the carbon bisulphide to the press cake, immediately, and it is to be understood that the term ageing, as hereinafter used, implies ageing in excess of twenty-four hours.

In making up the viscose solution the matter of temperature is important, but in my method excessive cooling is not necessary and the solutions have been made at 18°–20° C.—which is of great value and convenience in commercial operation. The soda-cellulose is best prepared at this temperature and the carbon bisulphide added thereto at any time within twenty-four hours. Under these circumstances the xanthate formation takes place within one hour and at the temperature stated.

Having thus described my invention, what I claim is:

The process of producing viscose for the production of cellulose films, filaments or threads, which consists in treating soda cellulose with carbon bisulphide to form the cellulose xanthate without ageing the said soda cellulose and by using a weight of $CS_2$ which, instead of being 40–60% of the weight of cellulose, is only 30–32%, the reaction taking place at a temperature of approximately 20° C. but without refrigeration, and dissolving such cellulose xanthate without ageing in an alkaline solvent, containing an amount of caustic soda such that the total amount of caustic soda is not less than the weight of the cellulose in weight and not more by 2%.

In testimony whereof I affix my signature in the presence of two witnesses.

WALDEMAR OSCAR MITSCHERLING.

Witnesses:
 FREDERIC BONNET, Jr.,
 THOMAS J. LOFFEY.